Figure 1:
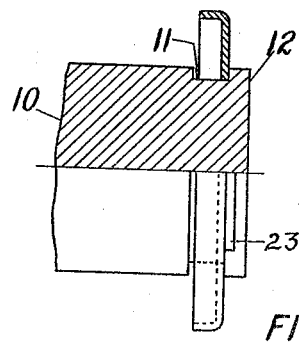

June 1, 1926.

H. M. FUNNELL 1,587,224

SPRING RETAINER

Filed Feb. 9, 1925

HARRY MAWSON FUNNELL
INVENTOR

BY
ATTORNEY

Patented June 1, 1926.

1,587,224

UNITED STATES PATENT OFFICE.

HARRY MAWSON FUNNELL, OF DUNELLEN, NEW JERSEY.

SPRING RETAINER.

Application filed February 9, 1925. Serial No. 7,975.

My invention relates to spring retainers especially for use on encased universal joints where two casings are held together in operating position by the action of a spring so that the wear of any packing in the casings is readily compensated, and has for its object the production of a spring retainer that can be installed without the use of any tools thereby presenting a convenient and ready means of removing the outside casing and inspecting the joint.

The foregoing and other features of my invention will now be described in connection with the accompanying drawings forming part of this specification in which I have represented my spring retainer in its preferred form after which I shall point out more particularly in the claims those features which I believe to be new and of my own invention.

In the drawings:—

Figure 1—is a side elevation of my spring retainer assembled, in part section.

Figure 2:
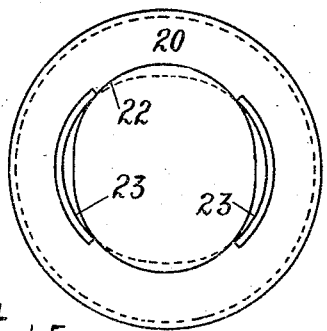

Figure 2—is an end elevation thereof looking from the right of Figure 1.

Figure 3:
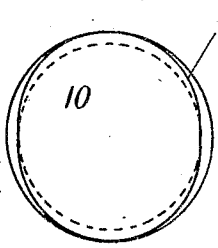

Figure 3—is an end view of the joint member with the retaining ring removed.

Figure 4:
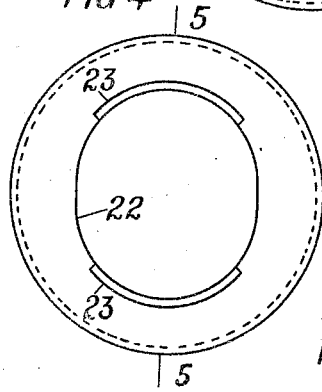

Figure 4—is a plan view of my retainer ring.

Figure 5:
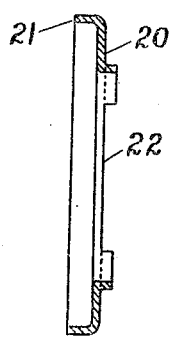

Figure 5—is a section thereof on line 5—5 Figure 4.

Figure 6:
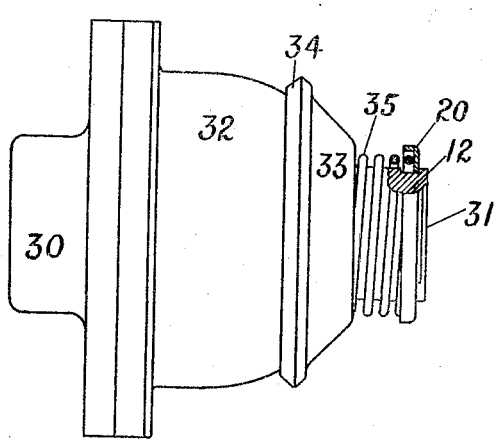

Figure 6—illustrates my spring retainer as installed on a standard encased universal joint.

Figure 7:
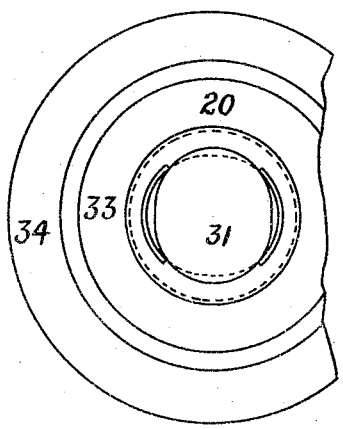

Figure 7—is a view as in Figure 6 at right angles thereto.

In the carrying out of my invention I employ a universal joint member 10 provided with a groove 11 and a flange 12 which is oval in shape as will be readily understood by referring to Figure 3.

A retainer ring 20 is provided with a flange 21 and a central oval opening 22 flanged as at 23 on opposite ends of the oval. This oval is about the same size as the oval flange 12 on the joint member so that the ring can be readily slipped over it, and when turned through an arc of ninety degrees the flanges 23 embrace the oval flange 12 at the small diameter which holds the ring in place. It will be observed by referring to Figure 2 that the flanges 23 embrace the small part of the oval flange 12 and the ends of these flanges will ride on the large part of the oval flange 12 thereby preventing rotation of the ring 20 until the ring 20 is pressed forward, to the left in Figure 1, so that flanges 23 are clear of the oval flange 12.

As an application of my invention to a universal joint I have illustrated in Figures 6 and 7 a standard encased universal joint showing a flange 30, joint member 31 all encased by means of inside casing 32 and outside casing 33. This outside casing slides over the inside casing and allows for an operating angle for the joint. To keep these two casings close together and to compensate for wear of a packing held in the annular ring 34 a spring 35 is provided. This spring is held in place by my retainer ring 20 and when turned through an arc of ninety degrees releases the spring permitting the withdrawal of the outside casing 33 from the inside casing 32 and the joint may be inspected and refilled with lubricant if necessary.

I wish it distinctly understood that my spring retainer for universal joints herein described and illustrated is in the form in which I desire to construct it but that changes or variations may be made as may be convenient or desirable without departing from the salient features of my invention and I, therefore, intend the following claims to cover such modifications as naturally fall within the lines of invention.

I claim:

1. A spring retainer for encased universal joint comprising a joint member formed with an oval flange thereon, a retainer ring provided with an oval hole adapted to go over the end of the joint member, said ring and joint member provided with integral interfitting means to hold the ring from turning in either direction.

2. A spring retainer for an encased universal joint comprising a joint member formed with an oval flange thereon, a retainer ring provided with an oval hole adapted to go over the flange on the joint member, means carried by the ring member to lock the two together preventing the ring from turning in either direction.

3. A spring retainer for an encased universal joint comprising a joint member formed with an oval flange thereon, a retainer ring provided with a flange on its periphery and a central opening adapted to slip over the oval flange on the joint member, said ring provided with flanges adapted to straddle the oval flange at its small diameter.

4. A spring retainer for an encased universal joint comprising a joint member formed with an oval flange thereon, a retainer ring provided with a flange on its periphery and an oval central opening, said ring being flanged on the ends of the oval opening and adapted to straddle the oval flange at its small diameter.

In testimony whereof I affix my signature.

HARRY MAWSON FUNNELL.